June 18, 1935.  W. A. HARRINGTON  2,005,521

MEANS FOR DETERMINING WEARING QUALITIES OF MATERIALS

Filed March 9, 1932  2 Sheets-Sheet 1

W. A. Harrington
INVENTOR

By Marks & Clerk
Attys.

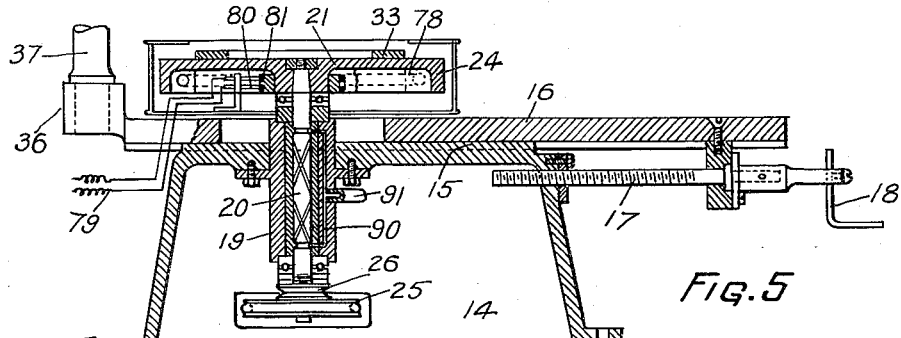
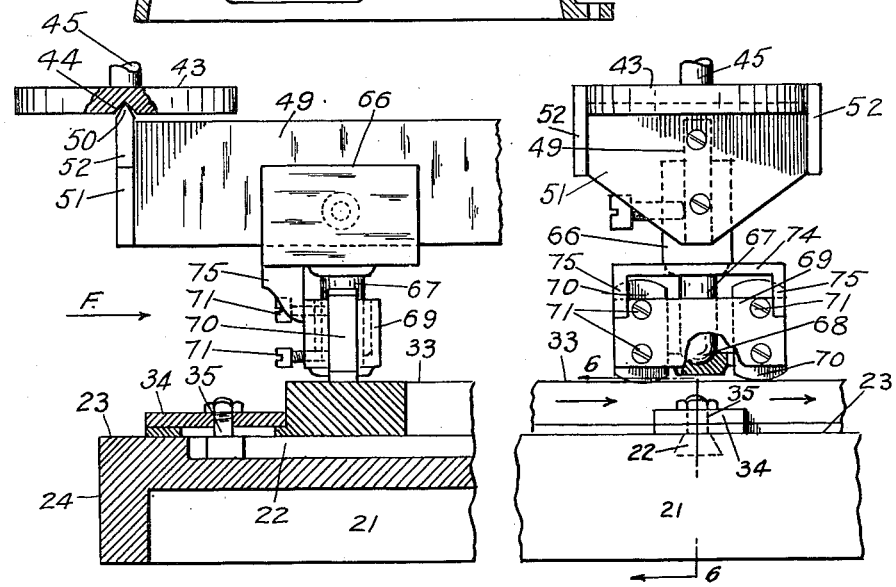
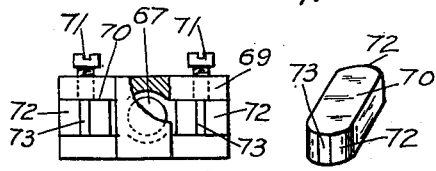
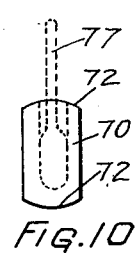
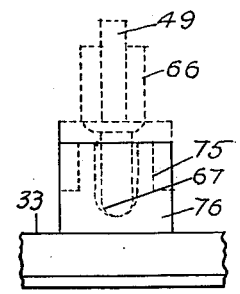
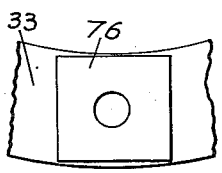
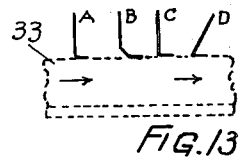

Patented June 18, 1935

2,005,521

UNITED STATES PATENT OFFICE 2,005,521

MEANS FOR DETERMINING WEARING QUALITIES OF MATERIALS

William Alfred Harrington, Leichhardt, near Sydney, New South Wales, Australia

Application March 9, 1932, Serial No. 597,835
In Australia March 12, 1931

7 Claims. (Cl. 73—51)

This invention relates to a means for determining wearing qualities of materials.

The invention is for the purpose of the determination of the relative wearing or wear-resisting qualities of different solids when in frictional contact, to the end that they may subsequent to test be listed or standardized relatively to their different standards of wearing or wear-resisting quality.

Such solids may be of the same metal of differing degrees of hardness or of different texture or molecular or crystalline structure. Again, such solids may be of quite different metals or alloys or may be non-metallic.

All such determinations are, by the use of testing means according to the invention, capable of being conveniently arrived at with reference to pre-determined and/or known factors relative to the moving and/or contacting part or parts of such testing means as for example the speed thereof; the load thereupon; the temperature thereof; the nature of the lubricant used; the thickness of the film of lubricant; the area of contact between parts; the degree of fineness of the finished surfaces of the said contacting parts; and the duration of the test.

An important feature of the invention resides in the special manner of preparation or formation of the contacting end or face of a section or piece of a material to be tested, such manner of preparation enabling any number of standardized tests to be successively and accurately performed and so that the relation between the wearing or wear-resisting qualities of different pieces tested may be definitely and accurately and scientifically ascertained.

Such contacting end or face has a curved configuration of pre-determined geometrical shape which is capable of being worn during testing operations into a readily measurable "flat" or area or portion of progressively increasing size which has a definite relationship to the wearing quality of the material being tested. Preferably the curvature of such end or face is definitely and accurately formed in the shape of an arc of a circle of a known radius which arc during testing operations is partially worn to form a "flat" or chord. It is from a careful measurement microscopically or otherwise of the length of the "flat" or chord formed by such wearing or abrasion of the test piece that the wearing or wear-resisting qualities of different materials tested are definitely ascertained and standardized. Such materials may then be listed relatively to their different standards of wearing or wear-resisting quality.

A testing apparatus according to the invention and for the purpose hereinbefore set forth embodies means for measuring the thickness of the film of lubricant between contacting parts; and means for the determination of the degrees of "oily-ness" or lubricating quality of value of an oil or grease or lubricant; to the end that the said thickness of the film of lubricant between contacting parts and the said lubricating quality of such lubricant to be later employed in carrying out a test of the wearing or wear-resisting quality of a solid, may be ascertainable and be duly taken into account.

From determinations such as have been mentioned many others of most interesting and valuable character as applied to engineering and commercial pursuits may be arrived at by recourse to simple mathematics. By way of example only it may be mentioned that information is made conveniently available concerning important issues such as the following:—

(1) The relation between the relative wearing or wear-resisting qualities of different materials as metals on the one hand and the speed of moving parts of mechanisms and the load thereupon on the other hand.

(2) The relation between the relative wearing or wear-resisting qualities of different materials on the one hand when on the other hand lubricants of different character are utilized.

(3) The relation between the relative wearing or wear-resisting qualities of different materials as metals on the one hand and the degree of fineness of their finished surfaces on the other hand.

(4) What greater or lesser power relatively is required to overcome friction when different lubricants are utilized?

The means employed according to the invention to carry into effect its stated objectives may take many and varied forms but it will suffice herein to detail only one example thereof with reference to a construction designed to apply tests to solids and which may be conveniently described with regard in particular to the relative wearing or wear-resisting qualities of test pieces formed from a piston ring portion and/or from portion of the inner wall of a cylinder therefor.

To facilitate such description reference will now be had to the accompanying drawings wherein like reference numerals denote like parts throughout the several views which are as follows:—

Figure 5 is a longitudinal sectional view of the apparatus taken on the line 5—5 of Figure 2 with some of the parts removed for clearness of illustration.

Figure 6 is an enlarged broken view partly in section taken on the line 6—6 of Figure 7 and showing particular parts of the means for testing the relative wearing or wear-resisting qualities of metals.

Figure 7 is an end view, looking in the direction of the arrow F, of Figure 6 with parts broken away to illustrate clearly the interior construction.

Figure 8 is a plan beneath the metal test piece holder shown in Figures 1, 6 and 7.

Figure 9 is a perspective view of one of the test pieces shown in Figures 6, 7 and 8.

Figure 10 is a side view of a test piece which is formed with a cavity for the reception therein of a thermometer.

Figure 11 is an end view (broken) of test pieces set up for testing lubricants.

Figure 12 is a plan view of test pieces in Figure 11.

Figure 13 is a diagrammatic view of some of the various forms for the leading edges of test pieces used when testing lubricant.

Figure 1:
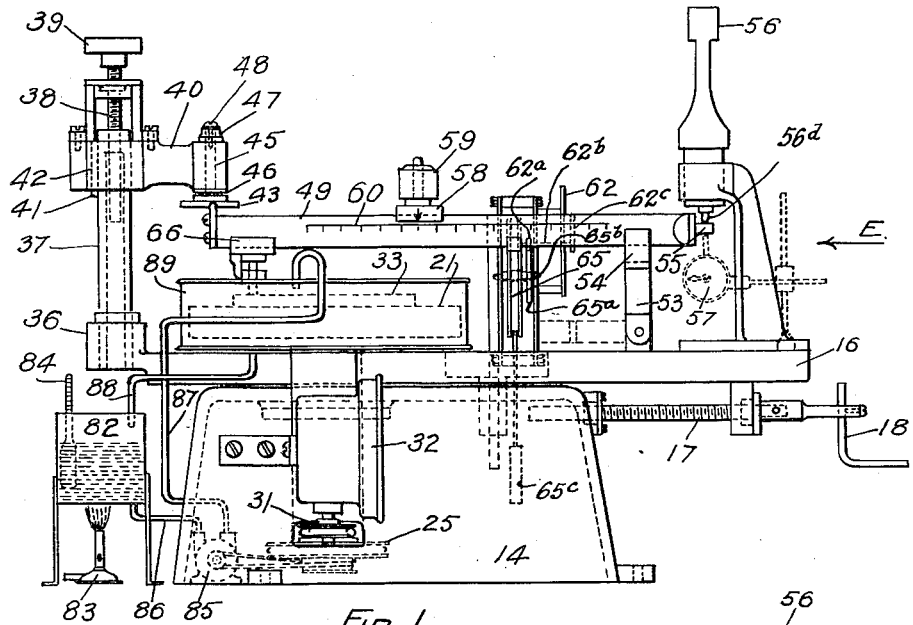
Figure 1 is a side view of a complete apparatus constructed according to the invention.

The apparatus has a base 14 which is provided with dove-tail shaped guide ways 15 upon which a slide 16 is mounted so as to be capable of to and fro movement, its movement and direction being when required controlled through the medium of a feed screw 17 operated by a handle 18.

In the base 14 is also mounted a vertically disposed detachable boss 19 which is bored to receive a vertical rotatable spindle 20 whose upper end passes upwardly beyond the slide 16 which latter is therefore conveniently slotted in order that its desired movement is possible without obstruction by the said upper end of the said spindle 20.

Fitted on the upper end of the said spindle 20 is a well-balanced circular face plate 21 which has a series of under-cut radially disposed dove-tail shaped grooves 22 one of which is indicated by dotted lines in Figure 7 of the drawings.

To detach the said boss 19 it is only necessary to unscrew the centrally located securing nut by which the face-plate 21 is fitted to the upper end of the spindle 20, remove the face plate, and then by unscrewing the securing set screws for the boss 19 (clearly indicated by Figure 5) the later together with the spindle is rendered wholly detachable upon lifting the base 14.

The upper surface 23 and edges 24 of the face-plate 21 are truly machined and finely finished so that the said face plate 21 may rotate evenly and without vibration.

The lower end of the spindle 20 is fitted with grooved pulleys 25 and 26, the pulley 25 being of comparatively large diameter and being connected by belt 27 to pulley 28 of an electric motor 29, while the pulley 26 is of smaller diameter and is connected by belt 30 to pulley 31 of a speedometer 32 or other suitable speed registering device, which functions as a speed indicator and also counts the number of revolutions.

On the upper surface 23 of the face-plate 21 a circular ring-shaped piece 33, is fixedly mounted as by clamping plates 34 and clamping bolts 35 the heads of which latter are adapted to snugly fit the undercut grooves 22.

The said piece 33 forms upon the face-plate 21 a circular track over and upon which may ride, in constant contact therewith, the specially formed lower end for example of a test piece as a portion of a piston ring to which reference will be again made.

An extension 36 of the slide 16 supports an upright circular pillar 37 which is partly hollowed and whose upper end is bored and threaded to engage a feed screw 38 fitted with a head 39 which functions in obvious manner and according to the direction of turning of the same to move the vertically slidable carrier 40 up or down the pillar 37. The said carrier 40 is prevented from rotation about the pillar 37 by a key 41 slidably fitted in a keyway 42.

A circular plate 43 has cut or formed diametrically across and from its under surface a substantial V-shaped groove 44 and is rotatably fitted in the carrier 40 by means of a spindle 45, a ball-thrust bearing 46 and adjusting screwed collar 47 and lock screw 48.

One end of the test beam 49 has attached to it a plate 51 formed with a specially hardened knife edge 50 which is designed to engage with the V-shaped groove 44 so as to form a comparatively frictionless pivotal fitting. Horns 52 on the plate 51 function to prevent or minimize tendency for any side movement of the latter relatively to the circular plate 43. Such horns thus function also to prevent or minimize tendency for any side movement of test pieces being tested relatively to the before-mentioned rotatably mounted circular bearing plate 43 and relatively in particular to the before-mentioned ring-shaped track 33 of the before-mentioned horizontally disposed rotatable face-plate 21.

When metal wearing tests are being carried out, side movement of the beam 49 may be effectually prevented by a foldable forked arm 53 (see Figure 1 of the drawings) whose upper forked end 54 may engage with and firmly hold the said test beam 49 in a centralized position relatively to the face-plate 21.

The test beam 49 together with measuring instruments is horizontally movable with the slide 16.

The free end of the test beam 49 is fitted with an arcuately shaped element 55 so designed to engage with the operating pin or pins of one or both of the sensitive fine reading measuring instruments 56 and 57 of any well-known type, each comprised as by a vertically movable rod actuating a lever (or levers) which in turn moves a pointer over a graduated scale or dial, and the said arcuately shaped element 55 is so shaped that it may be capable of continuous engagement with the said pin or pins so as to continuously indicate upon the dial or dials of the said instruments 56 and/or 57 even though there may be lateral movement or swinging of the free end of the test beam 49 about its pivotal point, since the circular plate 43 is integral with the spindle 45 which as stated is rotatably fitted in the carrier 40.

The instrument 56 preferably is graduated to permit of a reading say to one ten-thousandth part of an inch while the instrument 57 (indicated by dotted lines in Figure 1 of the drawings herein) permits readings say in thousandths parts only of an inch.

The measuring instrument 56 is of the same type as that one well known as the Hirth Minimeter and comprises a swinging pointer 56a attached to a rocking bar 56b which rocks on a fixed knife edge 56c.

A plunger 56d having a knife edge 56e also engages the rocking bar 56b and the latter is kept in engagement with the knife edge 56e by the pulling action of a tension spring 56f.

Figures 2, 3, 4:
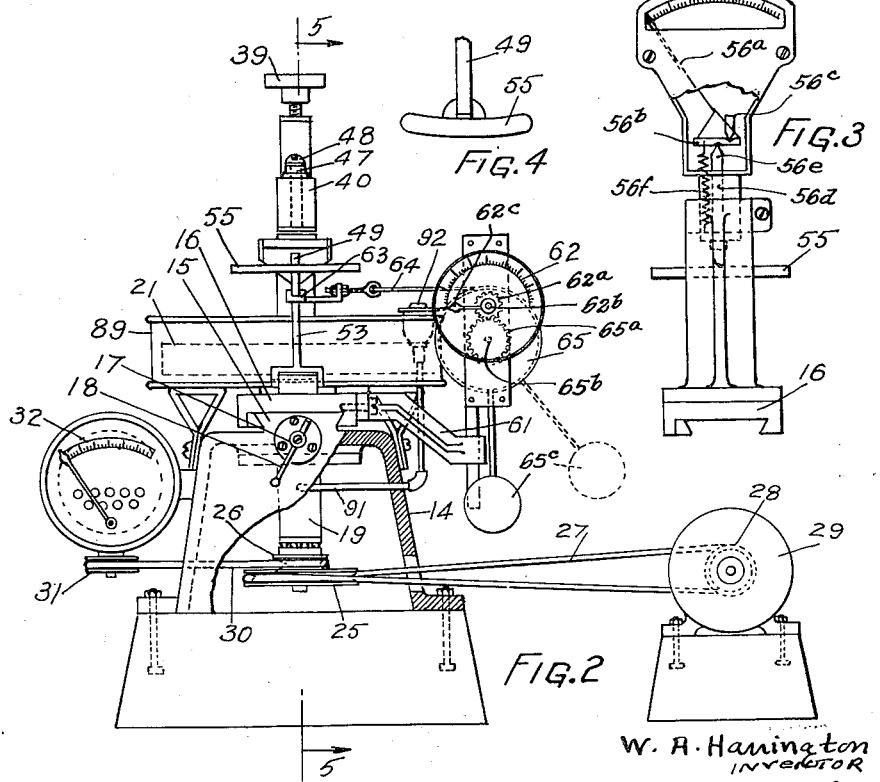
Figure 2 is an end view, looking in the direction of the arrow E, of the apparatus illustrated by Figure 1, the instrument 56 having been removed so as not to obstruct the view of other parts of the mechanism desired to be clearly shown.
Figure 3 is an end view of one of the measuring instruments fitted to the apparatus illustrated by Figure 1.
Figure 4 is a broken plan view of the free end of the test beam illustrated by Figure 1, such free end being designed to engage with the operating pin or pins of one or both of two fine reading dial instruments for measuring.

Movement of the pointer 56a is caused by raising or lowering the plunger 56d, see Figs 1 and 3, thus causing rocking of the bar 56b upon the fixed engaging knife edge 56c and the movable engaging knife edge 56e, the two knife edges being in slightly different planes.

From the dial of either or both of the said instruments 56 and 57 may be taken readings indicating (a) the extent of wear upon a test piece of solid material or (b) the thickness of a film of lubricant.

A slider 58 carries a weight 59 (of known weight but variable in regard thereto by the addition of other weights of known value) adapted to be moved along the test beam 49 to register with selected markings of a scale 60 which may be engraved on the test beam 49 and which is to represent units of weights and fractions thereof. Thus the load on the test beam 49 may be varied at will and even when the apparatus is functioning by merely sliding the weight 59 along the test beam 49 to the position required and as indicated by the selected marking of the scale 60.

On one side of the slide 16 is a bracket 61, Figure 2, adapted to carry a pendulum type of fine reading dial instrument 62 whose dial pointer functions to indicate the strength of the pull upon its pull cord 64 (the latter secured to operating drum 65 and by clamp 63 to beam 49) according to the degree or strength of the lateral pull upon the test beam 49 as when the mechanism is being used to test a lubricant and determine the "oily-ness" or lubricating quality or value of the latter from a consideration (with other factors) of the registered power required to overcome friction between two opposed surfaces (one of known surface area as that of the test piece 76) with the lubricant under test therebetween.

The pendulum instrument 62 illustrated in Figures 1 and 2 for the purpose of indicating the extent of the side movements of the test beam 49 is comprised by a small pinion 62a mounted upon a pivot 62b there being on one end of the said pivot 62b a pointer 62c which swings over the scale 62.

Meshing with the pinion 62a is a large gear wheel 65a mounted upon a pivot 65b and also mounted upon the pivot 65b is the drum 65 to which is attached by a suitable rod a pendulum weight 65c which by gravitational pull affords resistance to the pull of the test beam 49 by means of the pull cord 64 which latter is attached to the drum 65 and also, by clamp 63, to the test beam 49.

The dial of the said indicating instrument 62 may be specially graduated to meet the requirements of the invention, since as its pendulum is raised higher the extent of pull or power required to be exerted upon the pull cord 64 to further raise the said pendulum through each successive one of equidistantly spaced degree markings would be varied by reason of the greater leverage exerted by the said pendulum.

The extent of movement of the said pendulum or of its dial pointer is governed by the lateral movement of the beam 49 which latter is in turn directly governed by the extent of frictional effort exerted between the said two opposed surfaces of material, such extent of frictional effort being obviously in its turn governed by the degree of (or comparative lack of) "oily-ness" or lubricating quality or value of the lubricant under test.

As mentioned earlier herein, the thickness of the film of lubricant under test between the said two opposing surfaces is readily and simultaneously and automatically measurable. The free end of the beam 49 must, when lubricant to be tested is interposed between the said two opposing surfaces, be obviously raised according to the thickness of the film of lubricant so interposed, and the said arcuate element 55 bearing against and/or upon the pointer actuating pin and/or pins of the instruments 56 and/or 57 causes corresponding movement of the indicating pointer or pointers thereof.

Clamped to the beam 49 (preferably in such location between its free end and the knife edge 50 as to give a known leverage ratio as ten to one for convenience in making calculations according to the nature of the test) is a forked test clamp 66 from which depends a pin 67 having a rounded end 68 which seats in a correspondingly shaped depression of a test piece holder 69 the latter being slotted to receive the test pieces 70 which are securely clamped in position by set screws 71. The pin 67 being a free fit in the holder 69, the latter is able to maintain at all times a required vertical position should there be any angular movement of the pin 67 during testing operations.

Ends 72 of test pieces 70 are formed in accordance with that important feature of the invention before-mentioned namely in the shape of an arc of a circle of a known radius. The said ends 72 must be formed very accurately in preparation for the test as to wearing quality of the material. As before stated, the specially formed ends are during testing operations progressively worn into "flats" or chords of increasing length or size. The precise length of each of said flats or chords 73 so worn is subsequent to the testing operations measured as by a direct reading measuring microscope or by a vernier slide measuring instrument or by other approved means, and from careful measurement and any other known factors considered during the test such as those hereinafter indicated the different wearing qualities of different materials tested are ascertainable quite readily.

At one edge of the test clamp 66 is a bracket 74 which has downwardly projecting arms 75 adapted to engage the test piece holder 69 and so prevent independent rotation of the latter upon the pin 67.

For tests to determine the relative degree of

"oily-ness" or lubricating or wear resisting quality or value of a lubricant, there is utilized a test piece 76 (see Figures 11 and 12 of the drawings herein) such test piece being held as already described by the pin 67. The said test piece 76 in contradistinction to others beforementioned, is mainly characterized by the fact that it has at its testing end a flat surface area which is of known dimensions between which and the rotating element or ring shaped track 33 (or the face-plate 21 or another in lieu thereof should such be desirable) a film of lubricant is to be tested in the manner already described.

The leading edge of the test piece 76 may be formed in many different ways to bring about somewhat different results during test, four such different ways being diagrammatically illustrated by Figure 13 of the drawings herein. The direction of rotation of the face-plate 21 and its attached ring-shaped track 33, in the apparatus illustrated by the drawings herein, is indicated by arrows in Figures 7 and 13 thereof.

Referring to Figure 10 of the drawings herein, a small thermometer 77 is indicated by dotted lines inserted in the test piece 70 so that the temperature of the latter may be duly noted.

Associated with the face-plate 21 may be an electric heating element 78 connected with wires 79, brushes 80, and collector rings 81. The temperature of the face-plate may thus be controlled, so that the temperature of the test pieces and of the lubricant is also controllable.

Furthermore, when testing a lubricant, there may be associated with an apparatus according to the invention an oil container 82 (see Figure 1 of the drawings) which is heated by a burner 83 until the required degree of heat is noted by the reading of the thermometer 84. Such heated oil is circulated as by a pump 85 through pipes 86 and 87, any surplus being returned to the container 82 through drain pipe 88 from the bottom of a guard 89 which latter is fitted around and beneath the face plate 21 to prevent splashing of oil and also to exclude foreign matter. (See Figures 1 and 2 of the drawings.)

The vertical spindle 20 is lubricated by oil fed through passages 90 from the pipe 91 and lubricator 92.

The whole apparatus is firmly fitted upon a solid and substantial foundation so that vibration may be effectually obviated and so that the delicate measuring instruments used may not be adversely affected in any way.

The apparatus is set up for use for the purpose of testing the wearing or wear-resisting qualities of solids as metals in the following manner: Test pieces 70 of the particular quality or qualities and kind or kinds of metal or metals are securely clamped in the test piece holder 69 and placed in position upon the ring-shaped track 33. The test beam 49 with the clamp element 66 which it carries is now lowered and the pin 67 is entered into and engaged by the test piece holder 69. The knife edge 50 is engaged by the V-shaped groove 44 of the circular plate 43 and the test beam 49 is firmly held in a centralized position relatively to the face-plate 21 by being engaged by the uplifted forked arm 53, (see Figure 1 of the drawings).

The test beam 49 is now by adjustment of the feed screw 38 arranged so as to be in definite parallel relationship with the said horizontally disposed face-plate 21, the arcuate-shaped element 55 on the free end of the test beam 49 being simultaneously with such movement brought to bear upwardly against the pin of the measuring instrument 56 until a considerable reading is indicated on the dial of the latter Longitudinal adjustment of the test beam 49, if required as for adjustment of the test pieces 70 on the ring-shaped track 33, or for adjustment to a track of different diameter, is effected by means of the feed screw 17 and slide 16.

Rotation is now imparted at desired known pre-determined regulated speed to the faceplate 21 and attached ring-shaped track 33 by the electric motor 29 which is set in motion. Thus a continuous frictional contact is ensured between the test pieces 70 and track 33 and the extent of such frictional contact or the "load" is of pre-determined known value according to adjustment of the position and/or alteration of the weight of the slidable weight 59.

As wear takes place on the test pieces 70 the free end of the beam 49 falls by gravity and the extent of the fall is indicated on the dial of either one or both sensitive fine reading measuring instruments 56 and 57, readings of which latter taken at different times during testing operations give some visible indication of the extent of wear brought about.

When the test has proceeded over a known pre-determined period of time the motor is stopped and the test pieces 70 are removed when by a careful measurement of each worn "flat" or chord 73 in manner as before set forth the wearing or wear-resisting quality of the material of each test piece is ascertained and the material may be listed or classified accordingly.

Tests may be carried out with and without lubrication between test pieces and track and the relative effects or both noted if desired. Of course when as is usual a lubricant is used it should for complete accuracy of test be of known standard lubricating or wear-resisting value and function at a known temperature.

Tests may be carried out at different speeds, and with different "loads", and over different periods of time, and the effects at each speed and with each "load" and over each period noted.

When using the apparatus for testing the degree of "oily-ness" or lubricating or wear-resisting quality or value of a lubricant the forked arm 53 is first folded downwardly (as indicated by dotted lines in Figure 1) to permit freedom of lateral movement of the beam 49 which latter is adjusted in regard to its lateral position as may be required. The testing piece 76 the flat surface area of whose testing end is known is then employed in co-operation with the beam 49, the pull cord 64, and the dial instrument 62 to function in manner already set forth.

The registered movement upon the dial of the measuring instrument 62 of the test piece 76 of known lubricated surface area indicates the degree of "oily-ness" or lubricating quality or value of the lubricant according to the consequent varying power or pull required to overcome friction between the test piece 76 and the face-plate 21, the thickness of the film of lubricant being at all times simultaneously measured by the measuring instruments 56 and/or 57 since the arcuate element 55 bears against and/or upon the pin or pins of the said measuring instruments 56 and 57 at all times notwithstanding lateral movement of the beam 49.

In this manner is ascertainable the lubricating or wear-resisting quality of a lubricant to be later employed when applying a test of a solid.

What I do claim is:—

1. A mechanism for the purpose described comprising a base, a detachable boss mounted within the said base, a vertical spindle rotatable within the said boss, a horizontally disposed rotatable face-plate supported on the spindle, a ring-shaped track detachably mounted upon the said face-plate, a screw-operated slide member horizontally mounted in the said base and supporting at one of its ends an upright pillar, a horizontally disposed carrier arm adjustable as to its height and carried by the said upright pillar, a rotatably mounted circular bearing plate carried by the said carrier arm and having formed diametrically across and from its under surface a V-shaped groove, a graduated test beam fitted with a slidable variable weight and having at one of its ends a knife-edged plate to engage with the said V-shaped groove, a forked test clamp associated with the said test beam, and a test-piece holder between the said test clamp and the said rotatable face-plate.

2. A mechanism as claimed in claim 1 and in which the said knife-edged plate has a pair of steadying horns which function to prevent or minimize tendency for any side movement of the said knife edged plate and of test pieces being tested, relatively to the said rotatably mounted circular bearing plate and the said ring shaped track of the said horizontally disposed rotatable face-plate.

3. A mechanism as claimed in claim 1 and in which the said test clamp is adjustably fitted to the said test beam and has downwardly projecting arms adapted to abut against the test-piece holder.

4. A mechanism as claimed in claim 1 and in which the test clamp has a depending pin which has a rounded extremity adapted to seat in a corresponding depression formed in the test piece holder.

5. A mechanism as claimed in claim 1, wherein a foldable forked arm is provided and adapted when required to engage the said test beam, said foldable forked arm when engaging said test beam functioning to prevent side movement of the latter and firmly holding it in a centralized position relative to the said face plate.

6. A mechanism as claimed in claim 1, in which at least one sensitive fine reading measuring instrument is associated with the mechanism and an arcuate shaped element is fitted on the free end of the test beam for continuously bearing upon the operating pin of the sensitive fine reading measuring instrument.

7. A mechanism as claimed in claim 1, in which at least one sensitive fine reading measuring instrument is associated with the mechanism and an arcuate shaped element is fitted on the free end of the test beam for continuously bearing upon the operating pin of the sensitive fine reading measuring instrument, an oil-testing test-piece having a known flat lubricated contact surface area, and a pendulum type of measuring instrument associated with the test piece and arranged to measure the degree of movement of the said oil-testing test-piece across the said rotatable face-plate.

WILLIAM ALFRED HARRINGTON.